United States Patent
Yang et al.

(10) Patent No.: US 8,423,481 B2
(45) Date of Patent: Apr. 16, 2013

(54) SELF-LEARNING METHOD FOR KEYWORD BASED HUMAN MACHINE INTERACTION AND PORTABLE NAVIGATION DEVICE

(75) Inventors: Yin-pin Yang, Taipei (TW);
Ching-Chung Chan, Taipei (TW);
Xiao-Ming Lin, Taipei (TW)

(73) Assignee: Mitac International Corp., Taoyuan (TW)

( * ) Notice: Subject to any disclaimer, the term of this patent is extended or adjusted under 35 U.S.C. 154(b) by 862 days.

(21) Appl. No.: 12/574,394

(22) Filed: Oct. 6, 2009

(65) Prior Publication Data
US 2010/0088254 A1 Apr. 8, 2010

(30) Foreign Application Priority Data
Oct. 7, 2008 (TW) ................................ 97138538 A (51) Int. Cl.
*G06F 17/00* (2006.01)
(52) U.S. Cl.
USPC .................................. 706/11; 707/729; 705/9
(58) Field of Classification Search .................... 706/11; 707/729; 704/9
See application file for complete search history.

(56) References Cited

U.S. PATENT DOCUMENTS

| | | | |
|---|---|---|---|
| 4,849,898 A * | 7/1989 | Adi ....................................... 1/1 |
| 5,893,095 A * | 4/1999 | Jain et al. ............................... 1/1 |
| 6,240,378 B1 * | 5/2001 | Imanaka et al. .................... 704/9 |
| 6,965,900 B2 * | 11/2005 | Srinivasa et al. ...................... 1/1 |
| 7,698,266 B1 * | 4/2010 | Weissman et al. ...... 707/999.005 |
| 7,962,480 B1 * | 6/2011 | Zhang et al. .................... 707/729 |
| 8,229,900 B2 * | 7/2012 | Houle ............................ 707/692 |
| 2005/0108001 A1 * | 5/2005 | Aarskog ........................... 704/10 |
| 2006/0155751 A1 * | 7/2006 | Geshwind et al. ............. 707/102 |

* cited by examiner

*Primary Examiner* — Kakali Chaki
*Assistant Examiner* — Mai T Tran
(74) *Attorney, Agent, or Firm* — Birch, Stewart, Kolasch & Birch, LLP (57) ABSTRACT

A self-learning method for keyword based human machine interaction is disclosed. At least one of a plurality of keywords predetermined in a database is selected and a priority score of the selected keyword is updated and a weighted factor is generated for the selected keyword. A weighted score and the weighted factor of the selected keyword are transmitted to the keywords related to the selected keyword. The selected keyword is pushed to a keyword buffer and linkage strengths between the keywords in the keyword buffer are strengthened. When a keyword has been stored in the keyword buffer for over a predetermined reset time period, a reset operation is performed to remove the keyword from the keyword buffer.

25 Claims, 6 Drawing Sheets

| keyword | priority score | linkage strength | | | | | | |
|---|---|---|---|---|---|---|---|---|
| | | K1 | K2 | K3 | K4 | K5 | K6 | K7 |
| K1 | 90 | | 8 | 1 | 9 | 3 | 4 | 1 |
| K2 | 85 | 8 | | 1 | 1 | 1 | 1 | 1 |
| K3 | 83 | 1 | 1 | | 1 | 6 | 1 | 1 |
| K4 | 80 | 9 | 1 | 1 | | 1 | 1 | 1 |
| K5 | 77 | 3 | 1 | 6 | 1 | | 7 | 1 |
| K6 | 65 | 4 | 1 | 1 | 7 | 1 | | 5 |
| K7 | 50 | 1 | 1 | 1 | 1 | 1 | 5 | |

FIG. 2B

| keyword | priority score | linkage strength ||||||| 
|---|---|---|---|---|---|---|---|---|
| | | K1 | K2 | K3 | K4 | K5 | K6 | K7 |
| K1 | 95 | | 9 | 1 | 9.5 | 3 | 4 | 1 |
| K2 | 88 | 9 | | 1 | 1 | 1 | 1 | 1 |
| K3 | 83 | 1 | 1 | | 1 | 6 | 1 | 1 |
| K4 | 86 | 9.5 | 1 | 1 | | 1 | 7 | 1 |
| K5 | 78 | 3 | 1 | 6 | 1 | | 1 | 1 |
| K6 | 67 | 4 | 1 | 1 | 7 | 1 | | 5 |
| K7 | 50 | 1 | 1 | 1 | 1 | 1 | 5 | |

SELF-LEARNING METHOD FOR KEYWORD BASED HUMAN MACHINE INTERACTION AND PORTABLE NAVIGATION DEVICE

CROSS REFERENCE TO RELATED APPLICATIONS

This application claims priority of Taiwan Patent Application No. 097138538, filed on Oct. 7, 2008, the entirety of which is incorporated by reference herein.

BACKGROUND OF THE INVENTION

1. Field of the Invention

The present invention relates to human machine interaction, and particularly to self learning methods for keyword based human machine interaction.

2. Description of the Related Art

Driven by advancements in Global Positioning System (GPS) chips, modules, and components, lowering price and size thereof, GPS functions have increasingly been implemented in portable consumer electronic devices. The GPS can be applied in military, aviation, voyage fields, or even in mountain-climbing, positioning or car navigation systems. The car navigation device is the most popular one among the GPS devices.

Car navigation systems are typically divided into two categories: embedded navigation devices (for example, equipped in a car) or portable navigation devices. The portable navigation device may be a consumer electronic product specialized in GPS function or a consumer electronic product, such as a personal digital assistant (PDA) or a smart phone) having a navigation system built therein.

Conventionally, the portable navigation device is of simpler design than the embedded navigation device, but the GPS functions provided by the portable navigation device are enough for the basic use. Today, navigation devices, used mainly in cars, provide improved positioning functions, abundant graphics libraries (for dynamic navigation capabilities, weather condition forecasts, travel guides, voice sound navigation capabilities, online graphics library updates and so on) as well as being integrated with other popular applications.

Some portable navigation devices, used mainly in cars, are equipped with speech recognition functions. Users can operate the portable navigation device without physically touching the controls thereof. For example, users can use voice to operate the portable navigation device to provide information built therein or to provide information the device has retrieved from the network.

However, currently, speech recognition methods do not provide interactive communication between a user and a portable navigation system.

BRIEF SUMMARY OF THE INVENTION

The invention discloses self-learning methods for keyword based human machine interaction and a portable navigation device using the same. The user can enter a keyword into the portable navigation device so that the portable navigation device may estimate the priority of the keyword and actively or passively provide the user with required information.

The method predetermines a set of keywords in a database of a portable navigation device, and performs an initialization operation to initialize the states of the keywords. Then, the method sorts the priority of the keywords according to the initialization operation results and displays the keywords on a screen of the portable navigation device. Moreover, the method selects at least one of the keywords, assigns a weighted score to the selected keyword, and performs a first calculation to refresh a priority score of the selected keyword. Also, the method generates a weighted factor for the selected keyword, transmits the weighted score and the weighted factor of the selected keyword to the related keywords (including keywords having a relationship with the selected keywords), and refreshes priority scores of the related keywords according to the weighted score and the weighted factor of the selected keyword, and re-sorts the priority of all keywords accordingly. The keywords on the screen are displayed according to the re-sorted result, and the selected keyword is pushed to a keyword buffer of the portable navigation device, and the length of time the keyword buffer has stored the keywords therein is monitored. A second calculation is performed to strengthen the linkage between the keywords stored in the keyword buffer and the priority scores of the keywords are refreshed accordingly. A reset operation is performed to remove the keyword that has been stored in the keyword buffer for over a predetermined time period, out from the keyword buffer.

An exemplary embodiment of the portable navigation devices of the invention comprises a database, a speech recognition device, a keyword buffer, a screen and a microprocessor. The database stores a set of keywords and a keyword table. The keyword table stores priority scores of the keywords and linkage strengths between the keywords. The speech recognition device receives voice commands. The screen displays the keywords and is capable of receiving a user input by a stylus or user's finger. Next, users may select at least one of the keywords through voice commands received by the speech recognition device or the user input by a stylus or user's finger, and the keyword buffer stores the selected keyword. Following, the microprocessor would execute the following procedures: perform an initialization operation to initialize the states of the keywords, sort the priority of the keywords according to the initialization operation results and display the keywords on the screen, select at least one of the keywords according to the voice commands received by the speech recognition device or the user input by a stylus or user's finger, assign a weighted score to the selected keyword, refresh the keyword table wherein the priority score of the selected keyword is refreshed according to the weighted score of the selected keyword, generate a weighted factor for the selected keyword, transmit the weighted score and the weighted factor of the selected keyword to the related keywords, refresh the priority scores of the related keywords according to the weighted score and the weighted factor of the selected keyword and re-sort the priority of all keywords accordingly, display the keywords on the screen according to the re-sorted results, push the selected keyword to the keyword buffer, monitor the length of time the keyword buffer has stored the keywords therein, perform a calculation to strengthen the linkage strengths between the keywords stored in the keyword buffer, refresh the priority scores of the keywords according to the current linkage strengths between the keywords, and perform a reset operation to remove the keyword that has been stored in the keyword buffer for over a predetermined time period out from the keyword buffer.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows several exemplary embodiments carrying out the invention. This description is made for the purpose of illustrating the general principles of the invention and should not be taken in a limiting sense. The scope of the invention is best determined by reference to the appended claims.

The invention discloses self-learning methods for keyword based human machine interaction, and portable navigation devices using the same.

Figure 1:
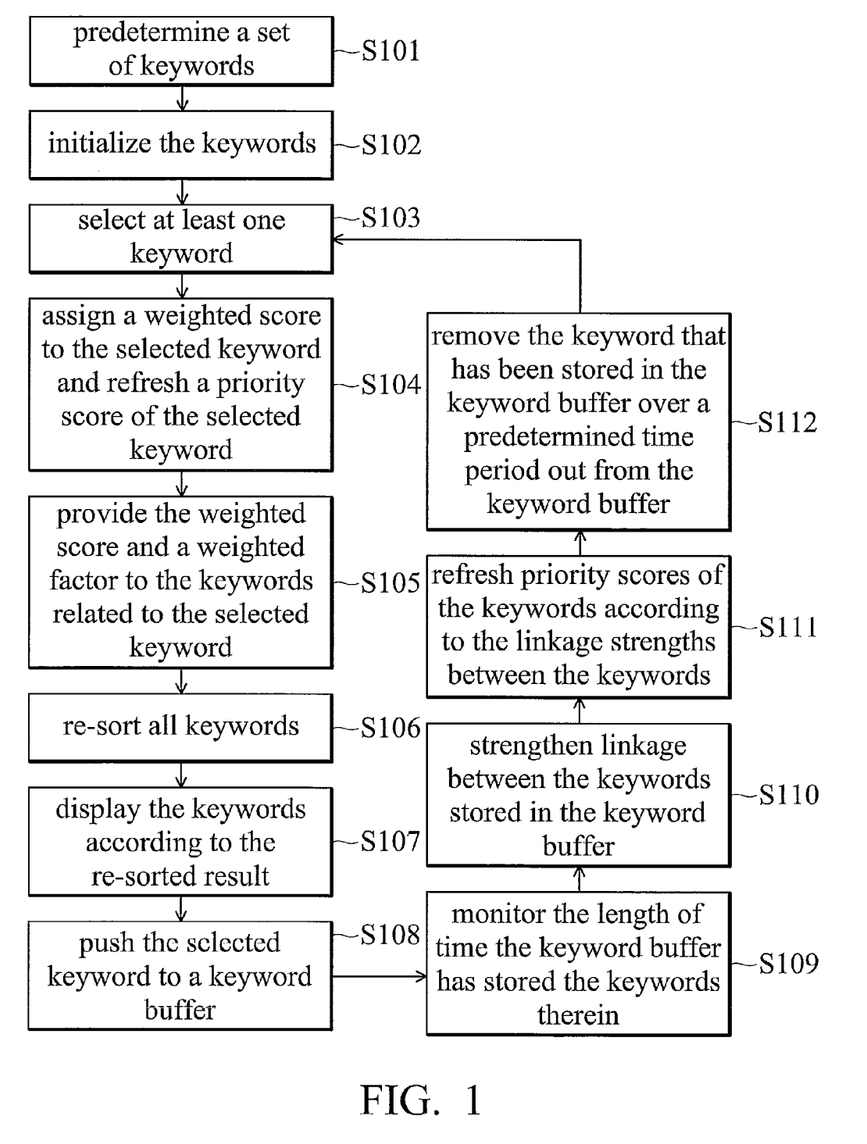
FIG. 1 depicts a flowchart, which shows an exemplary embodiment of the self-learning methods of the invention.

FIG. 1 depicts a flowchart, which shows an exemplary embodiment of a self-learning method for keyword based human machine interaction.

Figure 2A:
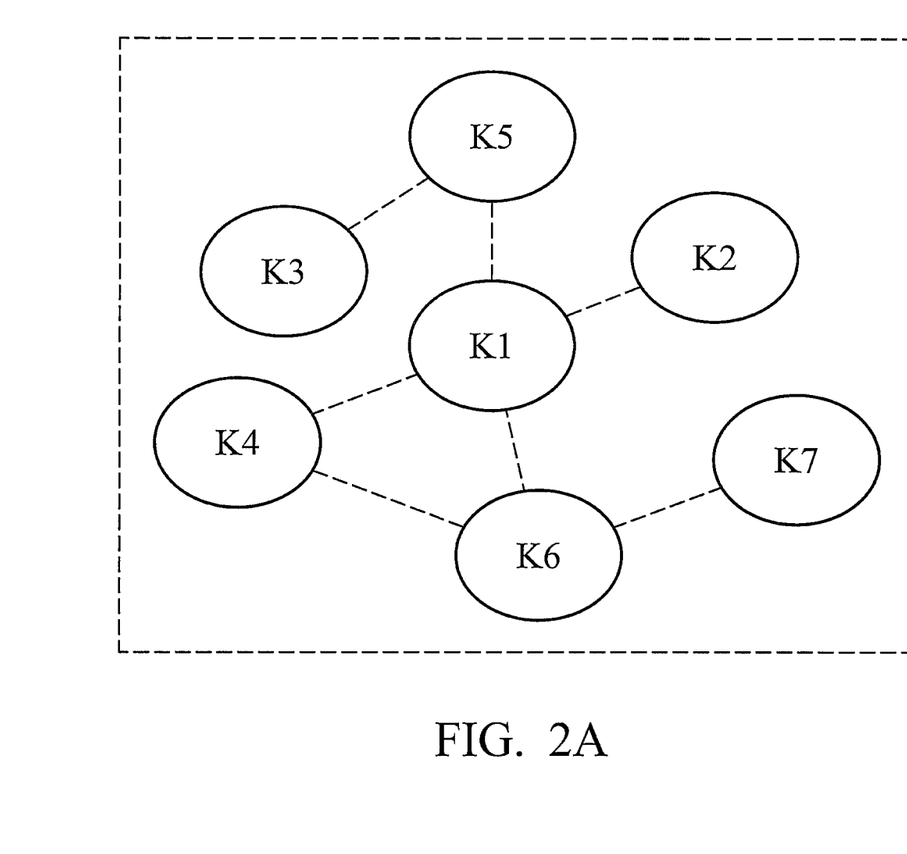
FIG. 2A depicts an exemplary embodiment of the invention, wherein seven keywords are introduced and the relation between the keywords are shown by dashed lines.
Figure 2B:
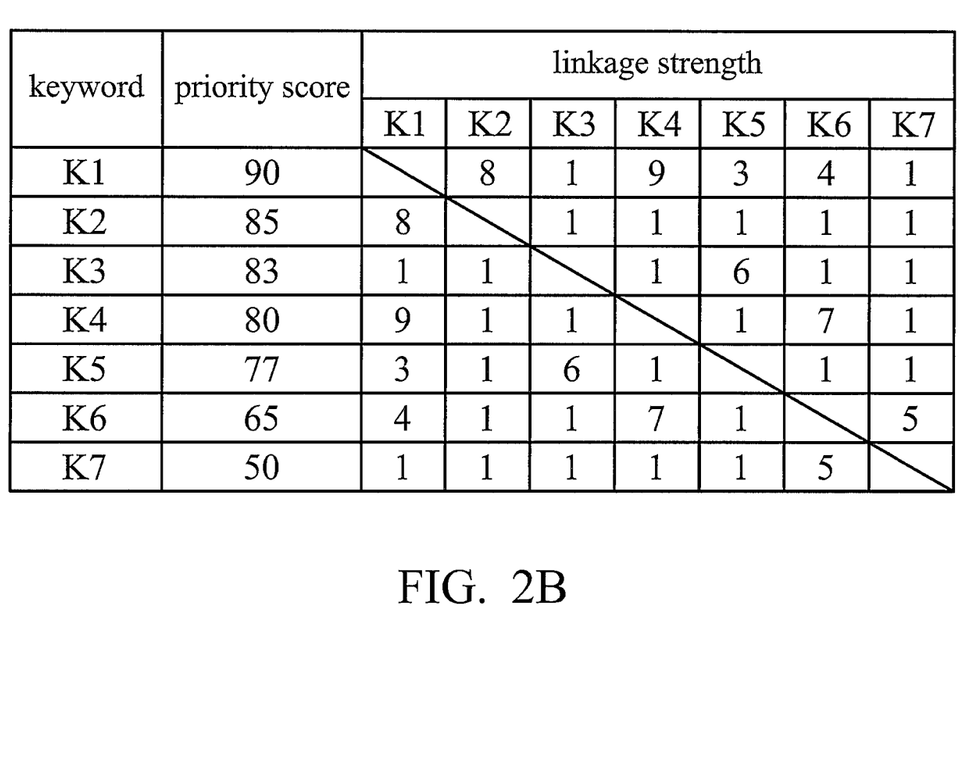
FIGS. 2B and 2C show a keyword table at two different time periods.

In step S101, at least one set of keywords is predetermined in a database of a portable navigation device. FIG. 2A shows one example of the set of keywords, wherein the set of keywords includes keywords K1 . . . K7, and the relation between the keywords K1 . . . K7 is shown by dashed lines. Initially, the predetermined keywords may have no relationship or some relationship to each other. As shown in FIG. 2A, there is a link, shown by one dashed line, between two keywords with a relationship. Each keyword is assigned a priority score. The higher the priority score is, the more frequent the corresponding keyword is used. For example, in a case wherein the top mark is 100 points, keyword K1 may be initially assigned 90 points, keyword K2 may be initially assigned 85 points and keyword K3 may be initially assigned 83 points . . . and the rest of the keywords K4 . . . K7 are similarly assigned priority scores. The priority scores of the keywords are stored in a keyword table as shown in FIG. 2B. It should be noted that the number of keywords is not limited to 7 and may be other amounts.

In step S102, all keywords predetermined in the database are initialized, the priority of the keywords is sorted according to the initialization result, and the keywords are displayed on a screen of the portable navigation device according to the sorted result. In the initialization operation, the priority of the keywords is sorted based on the priority scores of the keywords and the linkage strengths between the keywords. Meanwhile, the size and color of the keywords and the maximum number of keywords available to be displayed on the screen are determined during the initialization operation. For example, the maximum amount of keywords allowed to be displayed on the screen may be 10; the keyword with the highest priority score may be shown in red and in the largest typeface, and the keyword with the second priority score may be shown in blue and in the second largest typeface, and so forth. Thus, users can clearly identify which keyword is most frequently used. In another embodiment, when the screen is displaying several keywords relating to each other, the keywords may be shown in the similar colors. For example, a keyword "destination" may be represented in green and another keyword "home" relevant to the keyword "destination" may be represented in grass green. In some embodiments, the portable navigation device is designed to show N keywords at most. The keyword display may be pages long. In this case, the user can browse through the pages by touch or voice. For voice commands, the voice commands may be "next" or "next page" and so on.

In step S103, at least one keyword is selected by the user via voice commands or via other user interfaces such as a touch panel. For example, in a case wherein the most frequently triggered event of the keyword "office" is "the shortest route", when the user says the keyword "office" or touches the screen to select the keyword "office" or handwrites the keyword "office" on the touch panel screen, the portable navigation device may automatically show the shortest route from the current position to the office. In some embodiments, the portable navigation device may automatically select at least one keyword according to trigger of an external event. For example, in a case wherein the user normally goes home from work or a particular restaurant at 6 pm., the portable navigation device may automatically show the route to go home or the particular restaurant at 6 pm. In another embodiment, the portable navigation device may further comprise a thermometer to show an external temperature to the user. In another embodiment, the portable navigation device may comprise a timer to provide timely information concerning certain events.

The external event may be a predetermined time period, weather condition, a position notification, a speed notification, or a navigation mode (for pedestrians or for cars) notification, or combinations thereof.

In step S104, when at least one keyword is selected, the portable navigation device may assign a weighted score to the selected keyword and perform a first calculation to refresh the priority score of the selected keyword. For example, when keyword "K1" is selected, the portable navigation device performs the first calculation based on the priority score of the keyword "K1" and a weighted score assigned to the keyword "K1" to output a new priority score for the keyword "K1". Comparing FIGS. 2B and 2C, the priority score of the keyword "K1" is refreshed, and referring to FIG. 2C, the refreshed priority score of keyword "K1" is 95. In step S105, a weighted factor is generated for the selected keyword and the weighted score and the weighted factor of the selected keyword are transmitted to the related keywords of the keyword "K1", where 0.0<weighted factor≦1.0.

In step S106, the priority scores of the related keywords are refreshed according to the weighted score and the weighted factor of the selected keyword, and the priority of all keywords are re-sorted accordingly. The re-sorting operation is similar to the sorting operation during the initialization process of step S102, wherein the priority of the keywords are re-sorted according to the current priority scores of the keywords and the linkage strengths between the keywords, and the size and color of the keywords are determined according to the re-sorted results. In step S107, the display of the keywords is refreshed on the screen according to the re-sorted results. In step S108, the selected keyword is pushed to a keyword buffer. Step S109 monitors the length of time the keyword buffer has stored the keywords therein.

Figure 2C:
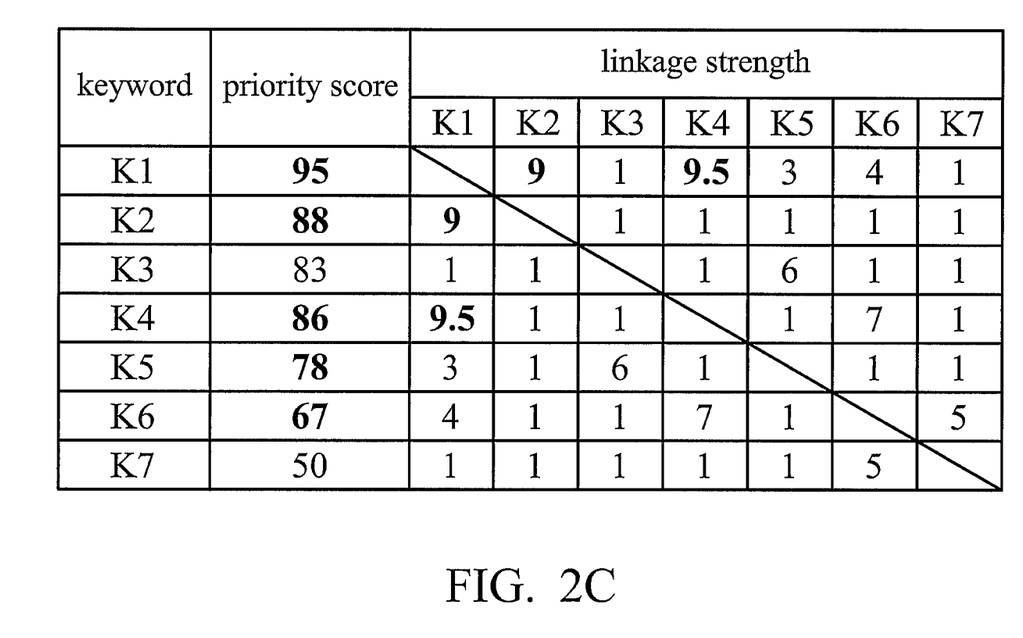
Figure 2D:
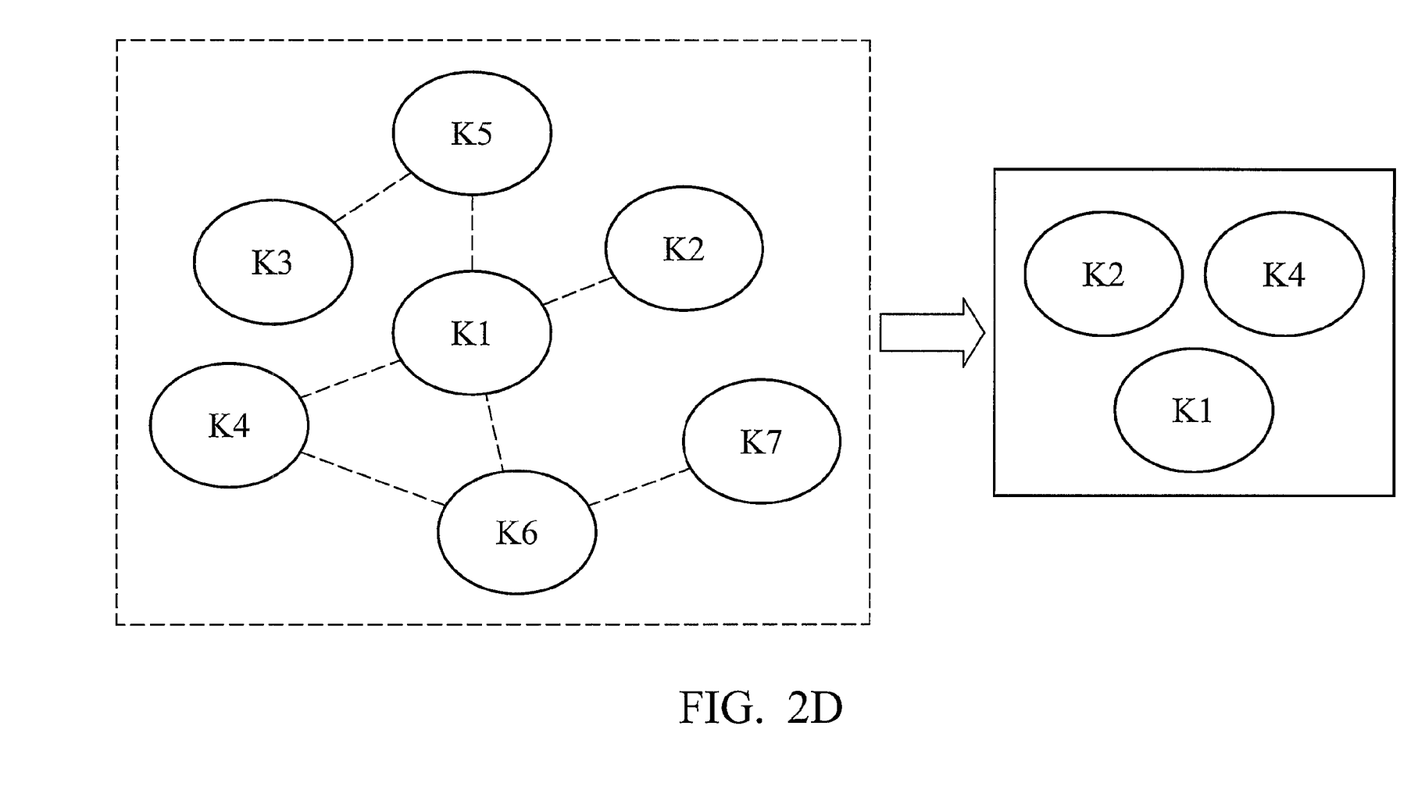
FIG. 2D shows several keywords of FIG. 2A are selected and pushed into a keyword buffer.

In step S110, a second calculation is performed to strengthen the linkage strengths between the keywords stored in the keyword buffer. In step S111, according to the linkage strengths refreshed in step S110, the priority scores of the keywords are refreshed. The linkage strengths may be labeled from 1 to 10 and determines the values of the corresponding weighted factors. For example, when keywords "K2" and "K4" are selected after keyword "K1" is selected, two weighted factors are generated for the two keywords "K2"

and "K4", wherein the weighted factor for the keyword "K2" is dependent on the linkage strength between the keywords "K2" and "K1" (8, as shown in FIG. 2B) and the weighted factor for the keyword "K4" is dependent the linkage strength between the keywords "K4" and "K1" (9, as shown in FIG. 2B). The generated two weighted factors are used to refresh the priority scores of the keywords "K2" and "K4", respectively, and furthermore, are used in modifying the linkage strength between the keywords "K2" and "K1" and the linkage strength between the keywords "K4" and "K1". As shown in FIG. 2C, the refreshed value of the linkage strength between the keywords "K2" and "K1" is 9, and the refreshed value of the linkage strength between the keywords "K4" and "K1" is 9.5. When the keyword "K1" is stored in the keyword buffer for over a predetermined time period, a reset operation is performed (step S112) to remove the keyword "K1" from the keyword buffer. The scheme may return to step S103 when another keyword is selected.

Figure 3:
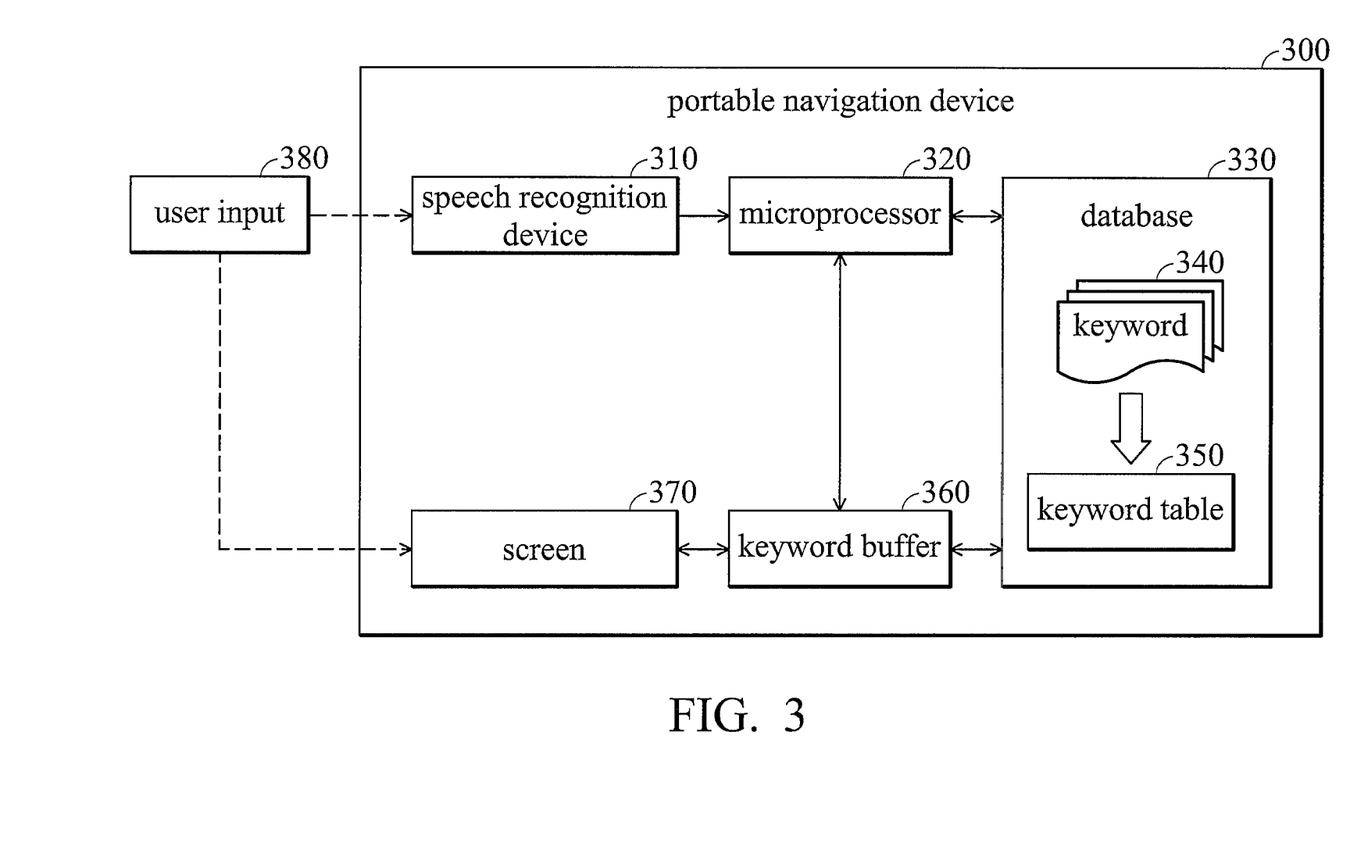
FIG. 3 depicts the architecture of an exemplary embodiment of the portable navigation device of the invention.

FIG. 3 depicts the architecture of an exemplary embodiment of the portable navigation device of the invention.

The portable navigation device 300 comprises a speech recognition device 310, a microprocessor 320, a database 330, a keyword buffer 360 and a screen 370. The database 330 includes a plurality of keywords 340 and a keyword table 350. The screen 360 may be a touch panel display.

The keywords 340 include a set of keywords K1 . . . K7 shown in FIG. 2A. The keyword table 350 may store the data shown in FIG. 2B, which includes a column of keywords, a column of priority scores and a column recording linkage strengths between the keywords. Initially, the predetermined keywords have no relationship or some relationship to each other. There is a link between the keywords having a relationship. Referring to FIG. 2A, the links are represented by dashed lines. Each of the keywords is assigned a priority score. High priority scores mean that the corresponding keywords are frequently used.

After the portable navigation device 300 is turned on, the microprocessor 320 initializes all keywords in the database 330 and sorts the priority of the keywords and displays the keywords on the screen 360 according to the initialization result. During initialization, the microprocessor 320 sorts the priority of the keywords based on the priority scores of the keywords and the linkage strengths between the keywords. In addition, the microprocessor 320 sets the size and color of the keywords and the maximum number of keywords allowed to be displayed on the screen. For example, the maximum amount of keywords allowed to be displayed on the screen may be 10. In some embodiments, the portable navigation device is designed to show N keywords at most. The keywords may be displayed on pages. The user can browse through the pages by touch panel techniques or by voice command control techniques. In voice command control techniques, the voice commands may be "next" or "next page" and so on.

There are many techniques which users may use to input command to the portable navigation device. For example, users may control the device by voice commands, and the speech recognition device 310 may receive voice commands from the user input 380, wherein the voice commands may contain at least one of the keywords. In another embodiment, the user may control the device via a touch panel display, and the screen 370 may detect the user input 380 (by a stylus or user's finger), wherein at least one of the keywords is selected. In some embodiments, the portable navigation device may comprise a thermometer, to detect an external temperature and provide the temperature information to the user. In some embodiments, the portable navigation device may further comprise a timer, to provide timely information concerning certain events.

When at least one of the keywords is selected by the user via the user input 380, the microprocessor 320 performs the step shown in step S104 of FIG. 1, wherein a weighted score is assigned to the selected keyword and a first calculation is performed to refresh the keyword table 350. Thus, refreshing the priority score of the selected keyword. Referring to FIG. 2A, when keyword "K1" is selected, the microprocessor 320 performs the first calculation according to the priority score of the keyword "K1" and the weighted score assigned to the keyword "K1" to obtain a new priority score for the keyword "K1". Comparing FIGS. 2B and 2C, the priority score of the keyword "K1" is refreshed; FIG. 2B shows that the original priority score of the keyword "K1" is 90 and FIG. 2C shows that the refreshed priority score of the keyword "K1" is 95. After the first calculation, the microprocessor 320 generates a weighted factor (0.0<weighted factor≦1.0) for the selected keyword, and transmits the weighted score and the weighted factor of the selected keyword to the related keywords.

The microprocessor 320 refreshes the keyword table 350 according to the weighted score and weighted factor of the selected keyword, wherein the priority scores of the related keywords of the keyword "K1" are refreshed. According to the refreshed priority scores, the microprocessor 320 further re-sorts the priority of the keywords. The re-sorting operation is similar to the sorting process of the initialization operation, wherein the size and color of the keywords are determined according to the priority scores of the keywords and the linkage strengths between the keywords. The microprocessor 320 displays the keywords on the screen 370 according to the re-sorted results, and pushes the selected keyword to the keyword buffer 360. The microprocessor 320 further monitors the length of time the keyword buffer 360 has stored the keywords therein.

After storing the selected keyword in the keyword buffer 360, the microprocessor 320 performs a second calculation to strengthen the linkage strengths between the keywords stored in the keyword buffer 360 and refreshes priority scores of all keywords recorded in the keyword table 350 based on the current linkage strengths between the keywords. The linkage strengths may be labeled from 1 to 10 and determines the values of the corresponding weighted factors. For example, when keywords "K2" and "K4" are selected after keyword "K1" is selected, two weighted factors are generated for the two keywords "K2" and "K4", wherein the weighted factor for the keyword "K2" is dependent on the linkage strength between the keywords "K2" and "K1" (8, as shown in FIG. 2B) and the weighted factor for the keyword "K4" is dependent the linkage strength between the keywords "K4" and "K1" (9, as shown in FIG. 2B). The generated two weighted factors are used in refreshing the priority scores of the keywords "K2" and "K4", respectively, and furthermore, are used in modifying the linkage strength between the keywords "K2" and "K1" and the linkage strength between the keywords "K4" and "K1". As shown in FIG. 2C, the refreshed value of the linkage strength between the keywords "K2" and "K1" is 9, and the refreshed value of the linkage strength between the keywords "K4" and "K1" is 9.5. When the keyword "K1" is stored in the keyword buffer for over a predetermined time period, the microprocessor 320 performs a reset operation to remove the keyword "K1" from the keyword buffer.

As shown in the aforementioned paragraphs, when a keyword is selected, the priority score of the selected keyword is increased, that is dependent on the strength of linkage between the selected keyword and its related keywords and the weighted factor generated for the selected keyword. In addition, the linkage strengths between the newly selected keywords are accordingly strengthened thereafter. Thus, the priority score of the selected keyword is in positive correlation with the linkage strengths between the newly selected keywords and weighted factor of the selected keyword, and the linkage strengths between the newly selected keywords are in positive correlation with the priority score of the selected keyword.

In some embodiments, the monitoring procedure may allow all keywords to be stored in the keyword buffer for an identical time limit. In other embodiments, the time limits for different keywords are different. The time limit for each keyword may be determined according to the significance of the keyword.

The self-learning method for the keyword based human machine interaction is an intelligent learning method. When a keyword is selected, the priority score of the selected keyword is increased and is dependent on the linkage strengths between the selected keyword and the related keywords and the weighted factor generated for the selected keyword. In addition, the linkage strengths between the newly selected keywords are accordingly strengthened thereafter. The self-learning method allows the portable navigation device to automatically show the frequently used information on a screen according to human machine interaction or an external event, which is more convenient for users.

The invention further discloses implementing storage media (such as an optical disc, a floppy disc, or a removable hard disc) to record computer readable right permission programs which realizes the aforementioned self-learning methods for keyword based human machine interaction. The program is basically composed of several codes, such as code segments for architecture building, code segments for permission tables, code segments for system settings, and code segments for program allocation. The code segments may realize the aforementioned steps or functions.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A self-learning method for keyword based human machine interaction, comprising:
    predetermining a set of keywords in a database of a portable navigation device;
    performing an initialization operation to initialize the set of keywords;
    sorting and displaying the set of keywords on a screen of the portable navigation device according to results of the initialization operation;
    selecting at least one of the keywords;
    assigning a weighted score to the selected keyword and performing a first calculation to refresh a priority score of the selected keyword;
    generating a weighted factor for the selected keyword and transmitting the weighted score and the weighted factor of the selected keyword to the keywords related to the selected keyword;
    refreshing, according to the weighted score and the weighted factor of the selected keyword, priority scores of the keywords related to the selected keyword and accordingly re-sorting all keywords;
    displaying the keywords on the screen according to results of the re-sorting;
    pushing the selected keyword to a keyword buffer of the portable navigation device;
    performing a second calculation to strengthen linkage strengths between the keywords stored in the keyword buffer;
    refreshing priority scores of all keywords according to the linkage strengths; and
    performing a reset operation to remove the selected keyword out of the keyword buffer when the selected keyword stored in the keyword buffer has been stored over a predetermined time period.

2. The method as claimed in claim 1, wherein the keywords initially have no relationship or some relationship to each other and, for any pair of keywords having a relationship, there is a link representing the linkage strength therebetween.

3. The method as claimed in claim 1, wherein the higher the priority score is, the more frequent the corresponding keyword is used.

4. The method as claimed in claim 1, wherein the priority scores of the keywords are stored in a keyword table.

5. The method as claimed in claim 1, wherein the initialization operation comprises:
    sorting the priority of the keywords according to the priority scores of the keywords and the linkage strengths between the keywords; and
    setting the size and color of the keywords.

6. The method as claimed in claim 5, wherein the keywords having a relationship are displayed in similar colors.

7. The method as claimed in claim 1, wherein the priority score of the selected keyword is in positive correlation with the linkage strengths between the newly selected keywords and the weighted factor of the selected keyword.

8. The method as claimed in claim 1, wherein the linkage strengths between the newly selected keywords are in positive correlation with the priority score of the selected keyword.

9. The method as claimed in claim 1, wherein the step of keyword selection is implemented by speech recognition techniques or by user input via other interfaces.

10. The method as claimed in claim 1, wherein the keyword selection is triggered by an external event.

11. The method as claimed in claim 10, wherein the external event is a predetermined time period, weather condition, a position notification, a speed notification, or a navigation mode (for pedestrians or for cars) notification, or combinations thereof.

12. The method as claimed in claim 1, wherein the keyword selection is based on a detected result of a detector.

13. The method as claimed in claim 1, wherein the step of refreshing a priority score further comprises refreshing the linkage strengths between the keywords related to the selected keyword.

14. A portable navigation device, comprising:
    a database, comprising a set of keywords and a keyword table, wherein the keyword table records priority scores of the keywords and linkage strengths between the keywords;
    a speech recognition device, receiving voice commands;
    a screen, displaying the keywords and receiving user input triggered by a stylus or user's finger;
    a keyword buffer, storing the keyword selected by the voice commands or the user input triggered by a stylus or user's finger;

a microprocessor, performing an initialization operation to initialize the set of keywords, sorting priority of the set of keywords according to results of the initialization operation and displaying the set of keywords on the screen according to results of the sorting, selecting at least one of the keywords according to the voice commands or the user input triggered by a stylus or user's finger, assigning a weighted score to the selected keyword, refreshing the keyword table wherein the priory score of the selected keyword is refreshed according to the weighted score of the selected keyword, generating a weighted factor for the selected keyword, transmitting the weighted score and the weighted factor of the selected keyword to the keywords related to the selected keyword, refreshing the priority scores of the keywords related to the selected keyword according to the weighted score and the weighted factor of the selected keyword and re-sorting the priority of the keywords accordingly, displaying the keywords on the screen according to results of the re-sorting, pushing the selected keyword to the keyword buffer, strengthening linkage strengths between the keywords stored in the keyword buffer and refreshing the priority scores of all keywords accordingly, and performing a reset operation to remove the selected keyword out of the keyword buffer while the selected keyword has been stored in the keyword buffer over a predetermined time period.

15. The portable navigation device as claimed in claim 14, wherein the keywords initially have no relationship or some relationship to each other, and for any pair of keywords having a relationship, there is a link representing the linkage strength therebetween.

16. The portable navigation device as claimed in claim 14, wherein the higher the priority score is, the more frequent the corresponding keyword is used.

17. The portable navigation device as claimed in claim 14, wherein when performing the initialization operation, the microprocessor sorts the priority of the keywords according to the priority scores of the keywords and the linkage strengths between the keywords, and sets the size and color of the keywords.

18. The portable navigation device as claimed in claim 17, wherein the keywords having a relationship are displayed in similar colors.

19. The portable navigation device as claimed in claim 14, wherein the priority score of the selected keyword is in positive correlation with the linkage strengths, between the newly selected keywords and the weighted factor of the selected keyword.

20. The portable navigation device as claimed in claim 14, wherein the linkage strengths between the newly selected keyword are in positive correlation with the priority score of the selected keyword.

21. The portable navigation device as claimed in claim 14, wherein the microprocessor selects at least one of the set of keywords based on the voice commands received by the speech recognition device or user input via other interfaces.

22. The portable navigation device as claimed in claim 14, wherein the microprocessor selects at least one of the set of keywords based on an external event.

23. The portable navigation device as claimed in claim 22, wherein the external event is a predetermined time period, weather condition, a position notification, a speed notification, or a navigation mode (for pedestrians or for cars) notification, or combinations thereof.

24. The portable navigation device as claimed in claim 14, wherein the microprocessor selects at least one of the set of keywords based on a detected result of a detector.

25. The portable navigation device as claimed in claim 14, wherein when refreshing the priority scores of the keywords, the microprocessor further refreshes linkage strengths between the keywords.

* * * * *